July 1, 1969   H. DERSHIN ET AL   3,452,553
TRANSPIRATION COOLED WINDOW
Filed March 17, 1967
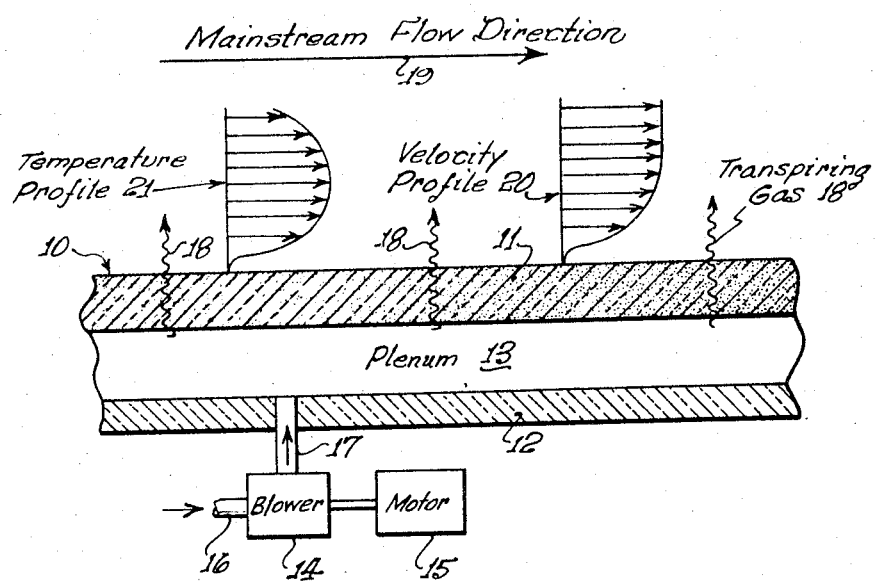
INVENTORS.
HARVEY DERSHIN,
CHARLES A. LEONARD,
By L.E. Carnahan
AGENT

United States Patent Office 3,452,553
Patented July 1, 1969

3,452,553
TRANSPIRATION COOLED WINDOW
Harvey Dershin, Claremont, and Charles A. Leonard, Pomona, Calif., assignors to General Dynamics Corporation, a corporation of Delaware
Filed Mar. 17, 1967, Ser. No. 623,925
Int. Cl. B60h 3/04; F47f 3/04
U.S. Cl. 62—239                                         6 Claims

ABSTRACT OF THE DISCLOSURE

This disclosure is directed to windows for supersonic aircraft and the like and in particular to the construction of a light-weight, double-glazed window having cooling means to offset the high temperatures associated with aerodynamic heating. The window is assembled in such a manner as to provide a gas plenum between an inner plate constructed with an appropriate strength-to-weight ratio and an outer plate of porous material such as Fotoceram. Cabin air or compressed bottle gas is injected into the plenum where it is then blown through the outer porous plate into the free stream of air particles in the boundary layer for transpiration cooling purposes.

Background of the invention

This invention generally relates to cooling means for high speed aircraft, and more particularly to a window construction for high speed aircraft utilizing transpiration cooling.

With the advent of high speed aircraft, particularly passenger type aircraft, attempts have been made to delete passenger windows because of the high temperature encountered in high speed flight, thus eliminating the use of expensive and heavy tempered glass. However, the strong psychological impact on the passengers by the proposed window elimination has necessitated the need for a window that is inexpensive, lightweight, and will withstand the high temperatures. While much effort has been directed to various means for cooling the body structure of high speed aircraft as exemplified by U.S. Patents 2,908,455 and 3,138,009, little known prior effort has been directed to windows of the above described type with means for cooling same.

Summary of the invention

This invention provides a lightweight window arrangement for high speed aircraft which can be cooled in an effective and inexpensive manner, while additionally serving to reduce the overall drag on the air frame. For example, in a supersonic transport (SST) application, the windows, if not cooled, would reach a temperature of about 450° F. at Mach number 2.5 and 70,000 ft. altitude. It is desirable to maintain the window temperature down to about 225° F. at these flight conditions. This is accomplished by this invention by the utilization of a spaced pair of appropriate window plates that have satisfactory optical properties and by injecting a cooling gas into the plenum formed by the spaced plates, one of the plates being porous such that the injected coolant passes through this plate thus cooling the window.

Therefore, it is an object of the invention to provide a means for preventing excessive temperatures particularly on the window surfaces of high speed vehicles which are subject to aerodynamic heating.

A further object of the invention is to provide a transpiration cooled window.

Another object of the invention is to provide a cooled window for high speed aircraft which is effective, inexpensive and of lightweight construction.

Another object of the invention is to provide a window for high speed vehicles which are subject to aerodynamic heating which includes a pair of spaced plates having satisfactory optical properties, the outer of said plates being porous, such that a coolant injected into the space between the plates passes outwardly through the porous plate thus cooling the window while additionally reducing the drag on the frame of the vehicle.

Other objects of the invention not specifically set forth above, will become readily apparent from the following description and accompanying drawing wherein:

Brief description of the drawing

The single figure is a view partially in cross-section, illustrating an embodiment of the invention and the effect thereof on the adjacent airstream.

Description of the embodiment

The window assembly illustrated in the drawing is a cooled, lightweight type can be utilized, for example, on supersonic vehicles such as a supersonic transport (SST) aircraft. The window assembly generally indicated at 10 consists of two layers or plates 11 and 12 of optical quality material separated by spacers (not shown) which also serves as a seal. An assembly consists of plates 11 and 12 and the associated spacers assembled such that a gas plenum or chamber 13 is created between the two plates. The outer plate 11 is constructed from a porous, optical material. The process for creating this porosity may be, but is not limited to, photoetching of a Corning Glass Company product called Fotoceram with, for example, 0.005 inch diameter holes etched 0.030 inch on-centers. The inner plate 12 is constructed from material having suitable optical properties and strength-to-weight ratio.

The transpiration gas or coolant as illustrated, is injected into the plenum 13 by a blower 14 driven by a motor or other prime mover 15. For example, cabin air is drawn into the blower 14 via intake duct 16 and discharged into plenum 13 via a discharge duct 17, as indicated by the arrows. While not shown, the blower 14 would incorporate means for filtering out any moisture from the air being injected into plenum 13 to prevent fogging or other adverse effects on the window. The transpiration gas indicated at 18 exhausts from plenum 13 via porous outer plate 11. Also, the transpiration gas may be an inert gas supplied from a compressed gas bottle.

While the gas injection means has been shown as passing through an aperture in the inner plate 12 for purpose of illustration, the gas would normally be injected through the spacer means (not shown) and where there are a plurality of windows, they would be interconnected by a conduit system which would serve to inject coolant gas into the individual plenums from a single pressure supply source.

It has been demonstrated, both analytically and experimentally, that transpiration of a gas, as indicated at 18, through a porous surface reduces the energy and momentum exchange between the porous surface (plate 11) and a parallel flowing gas indicated by the arrow 19. As illustrated in the drawing, the effect of the transpiration gas is to deflect the velocity profile 20 and temperature profile 21 of the airstream (boundary layer) away from the window plate 11, thereby reducing the resultant momentum and energy exchange.

For the SST application, for example, the window assembly 10, if not cooled, would reach a temperature of about 450° F. at Mach number 2.5 and 70,000 ft altitude. To keep the window temperature at 225° F. for example, would require approximately 0.027 lb. msec. of transpiration gas (assuming air at 60° F. for the coolant) per square foot of surface area, or roughly ⅓ standard cubic foot of air per foot squared per second. If, for example, the plenum gas is kept at −100° F., the required gas flow rate can be reduced by an order of magnitude.

It has thus been shown that the present invention provides a cooled, lightweight window arrangement for applications such as high speed aircraft windows which additionally assists in reducing the overall drag on the aircraft.

While a particular embodiment of the invention has been illustrated and described, modifications will become apparent to those skilled in the art, and it is intended to cover in the appended claims all such modifications as come within the true spirit and scope of the invention.

What we claim is:

1. A transpiration cooled window structure comprising a pair of layers of optical quality material positioned in spaced relationship to define a plenum therebetween, one of said layers of optical quality material being porous, and means for admitting coolant fluid to said plenum, whereby coolant admitted to said plenum is exhausted from said plenum through said porous layer of optical quality material thereby cooling the window structure.

2. The window structure defined in claim 1, wherein said porous layer of optical quality material is constructed from material having a multiplicity of apertures having about a 0.005 inch diameter extending therethrough.

3. The window structure defined in claim 2, wherein said multiplicity of apertures are positioned on about 0.030 inch centers with respect to one another.

4. The window structure defined in claim 1, additionally including means for supplying coolant fluid under pressure to said coolant fluid admitting means.

5. The window structure defined in claim 4, wherein said means for supplying coolant fluid under pressure comprises a blower means adapted for supplying air from an associated aircraft cabin and the like to said coolant fluid admitting means.

6. The window structure defined in claim 1, wherein the other of said layers of optical quality material is constructed with a strength-to-weight ratio sufficient to produce the required structural capabilities.

References Cited

UNITED STATES PATENTS

| | | | |
|---|---|---|---|
| 1,647,785 | 11/1927 | Coughlin | 62—248 |
| 1,934,133 | 11/1933 | Lauderback | 62—248 |
| 2,334,513 | 11/1943 | Shaw | 62—248 |
| 2,651,145 | 9/1953 | Stookey | 49—88 |
| 3,170,303 | 2/1965 | Ronnenberg | 62—315 |
| 3,197,973 | 8/1965 | Ronnenberg | 62—315 |
| 3,297,388 | 1/1967 | Woodcock | 350—1 |

WILLIAM J. WYE, *Primary Examiner.*

U.S. Cl. X.R.

62—248, 259, 315; 65—22, 31; 165—60; 244—117